UNITED STATES PATENT OFFICE.

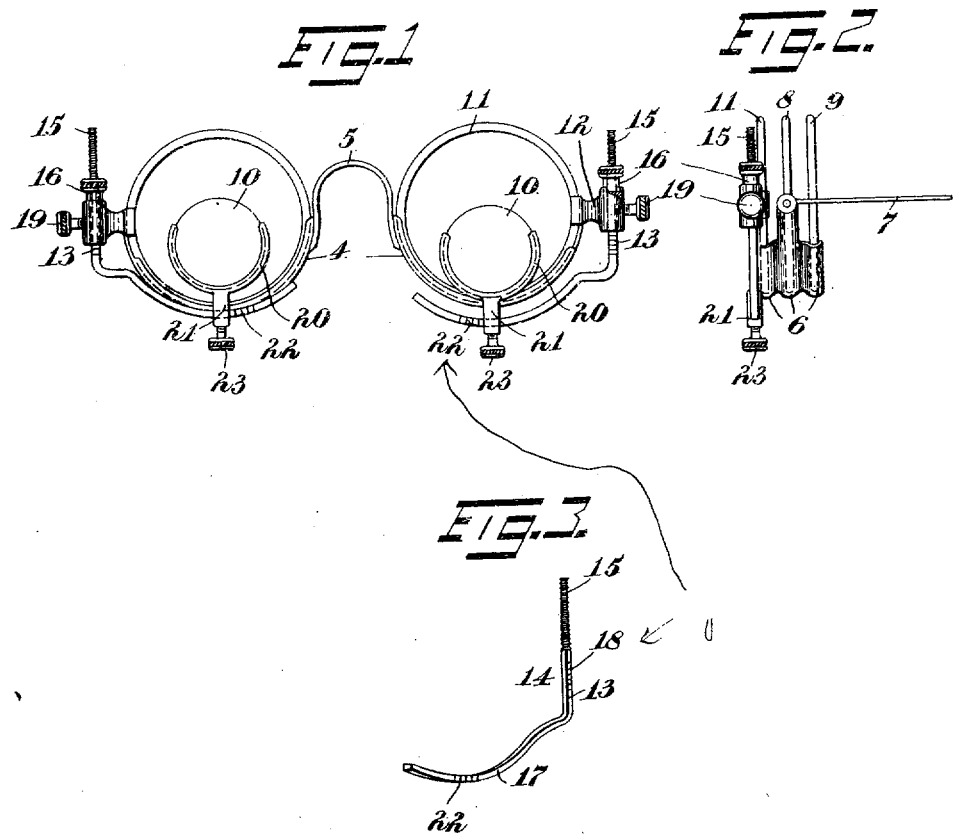

HARRY I. COWAN, OF BOSTON, MASSACHUSETTS, ASSIGNOR TO THE MERIDEN OPTICAL MANUFACTURING COMPANY, OF MERIDEN, CONNECTICUT, A CORPORATION OF CONNECTICUT.

BIFOCAL TESTING-FRAME.

980,070.    Specification of Letters Patent.    Patented Dec. 27, 1910.

Application filed August 23, 1909. Serial No. 514,132.

*To all whom it may concern:*

Be it known that I, HARRY I. COWAN, a citizen of the United States, residing in Boston, in the county of Suffolk and State of Massachusetts, have invented certain new and useful Improvements in Bifocal Testing-Frames, of which the following is a specification.

This invention relates to testing frames for eye-glasses and has for its object to provide a device whereby the testing lenses for a bifocal eye-glass may be placed before the eye of the patient in their proper relative positions. By means of this improvement not only can the correct position for the bifocal segment lens be ascertained but it will be possible to place testing lenses for the main lens for the distance correction in a testing frame and with these the segmental lens in its proper position relative to the main lens so that there may be before the patient's eye the two lenses in their proper relation.

In the drawings accompanying and forming a part of this specification, Figure 1 is a front view of a simple form of testing frame in which there is mounted a pair of testing frames embodying the present improvement. Fig. 2 is a view looking at Fig. 1 from the right hand end, and Fig. 3 is a detail in perspective of the bracket which supports the bifocal segment lens holder.

The form of main testing frame designated in a general way by 4 which is herein illustrated is such as is quite commonly used by oculists and opticians for enabling the patient to have the selected lenses before his eyes in a normal manner so that he may ascertain by actual use whether or not the selected lenses are what his eyes require. This form embodies a nose piece or bridge 5, a frame having a number of lens seats or pockets 6 and a temple 7. In this frame there are shown in position two testing lenses 8 and 9, reference is here made to Fig. 2, and in front of these lenses is mounted my improved frame for holding the bifocal segment testing lens 10. The lenses 10 will preferably be of a radius similar to that which will be given the upper portion of the segment on the finished and practicable bifocal lens. This holder comprises a portion 11 which is constructed and adapted to fit into one of the pockets or holders 6, preferably in front of the lenses which may be therein, which represent what will be the main portion of the eye-glass lens for the distance correction when this is completed. The frame 11 will preferably be made of the same diameter as the testing lenses 8 and 9 so that it may fit in the holders which are made to receive such lenses. It will also be made annular so that it will obscure as little as possible of the field of the lens.

The body portion carries an extension or ear 12 which is provided with a socket for receiving one portion 13 of bracket designated in a general way by 14 and represented in perspective in Fig. 3. The limb of the bracket which passes through the socket in the ear may be of angular cross section to prevent its rotation in the socket. The end portion 15 of the limb 13 will be screw-threaded so that by means of the adjusting nut 16 which is held by the ear 12 in such a manner that it may rotate but not move away from the ear, the transverse limb 17 of the bracket will be moved toward and from the center of the frame 11 and will preferably move in a plane parallel with the plane of such frame. Suitable graduations 18 are provided upon the limb 13 for indicating the vertical adjustment, and the bracket will be clamped in its position of vertical adjustment by means of the set screw 19. The bifocal segment testing lens holder 20 is provided with a stem or ear 21 which has a socket conforming in cross sectional configuration to that of the transverse limb 17 of the bracket 14 and by this means the segment testing lens 10 will be held from rotation about such limb 17. The limb 17 will be provided with suitable graduations 22 to indicate the position of adjustment of the segment testing lens holder 20, and a suitable set screw 23 will be provided for securing the lens holder 20 in its proper position of adjustment upon the transverse limb 17. The adjustment of the lens 10 will be in a plane parallel with the plane of the holder or body portion 11.

After it has been determined what correction is needed for the distance lens which will constitute the body portion of the eye-glass and what lens is needed for the bifocal segment lens the distance or body portion testing lenses 8 and 9 will be placed in the holder 6. The body portion 11 of the bifocal testing frame will be placed in another of the holding portions 6 and the selected segment testing lens 10 will be placed in its holder 20. It will then be necessary to adjust the limb 13 of the bracket 14 through the socket in the ear 12 to get the proper vertical relation between the segment testing lens and the main testing lens so that the wearer when looking through the main portion of the lens for distance will not see the edge of the segment and that the segment will be gotten in proper vertical position for short distances. This vertical adjustment will be effected by means of the set nut 16 and secured by means of the set screw 19. After the vertical adjustment has been effected the lateral adjustment will be effected by moving the ear 21 upon the transverse limb 17 to the desired position after which the set screw 23 will be screwed down. The limb 17 is shown as segmental so that the adjustment of the holder upon such limb 17 will not occasion much alteration in the vertical adjustment.

By using a bifocal segment testing lens of the same radius as that which will be employed in the upper curved edge of the segment in the finished lens, this testing lens will occupy in the testing frame the exact position relative to the eye which the segment in the lens as finished will occupy and the field of the distance lens will be free and unobstructed.

Having thus described my invention, I claim:

1. The combination with a holder for a bifocal segment testing lens, of a positioning member carrying the lens holder and constructed and adapted for seating in a testing frame and locating the lens holder in a predetermined position relative to such frame.

2. The combination with a holder for a bifocal segment testing lens, of a positioning member constructed and adapted for seating in a testing frame and locating the instrument in a predetermined position relative to such frame, and an adjustable connection between the positioning member and the lens holder.

3. The combination with a holder for a bifocal segment testing lens, of a positioning member constructed and adapted to be seated in a testing frame and to be located in a predetermined position relative to such frame, and a member adjustably connected to the positioning member and to the lens holder.

4. In a bifocal testing frame, the combination with a body portion having a socket, of a bracket having a portion mounted in the socket for adjustment and a portion disposed transversely to the socket entering portion, and a lens holder having a socket mounted on the said transverse portion of the bracket for adjustment longitudinally thereon in a plane parallel with the plane of said body portion.

5. The combination with a body portion constructed and adapted for seating in a testing frame, an ear carried thereby and having a guideway of angular cross sectional configuration, an adjusting nut mounted on the said ear adjacent the guideway, a bracket having a segmental limb and a limb disposed transversely to the segmental limb and provided with an angular cross sectional configuration and guided by said guideway in the ear and having a screw-threaded portion adjacent said angular portion, said screw-threaded portion being engaged by the adjusting nut, a lens holder, a socketed ear on the lens holder and mounted on the said segmental limb, and a set screw carried by said lens holder ear for securing the same in position on the bracket.

6. The combination with a testing frame for holding testing lenses, of a pair of positioning members seated in the testing frame, and a frame for holding a bifocal segment testing lens carried by each of the positioning members.

HARRY I. COWAN.

Witnesses:
JOHN J. CROWLEY,
GEO. W. JULIAN.